April 7, 1970     T. KOZOWYK ET AL     3,504,931
VEHICLE VARIABLE HEIGHT ACTUATOR
Filed Oct. 4, 1967     3 Sheets-Sheet 1
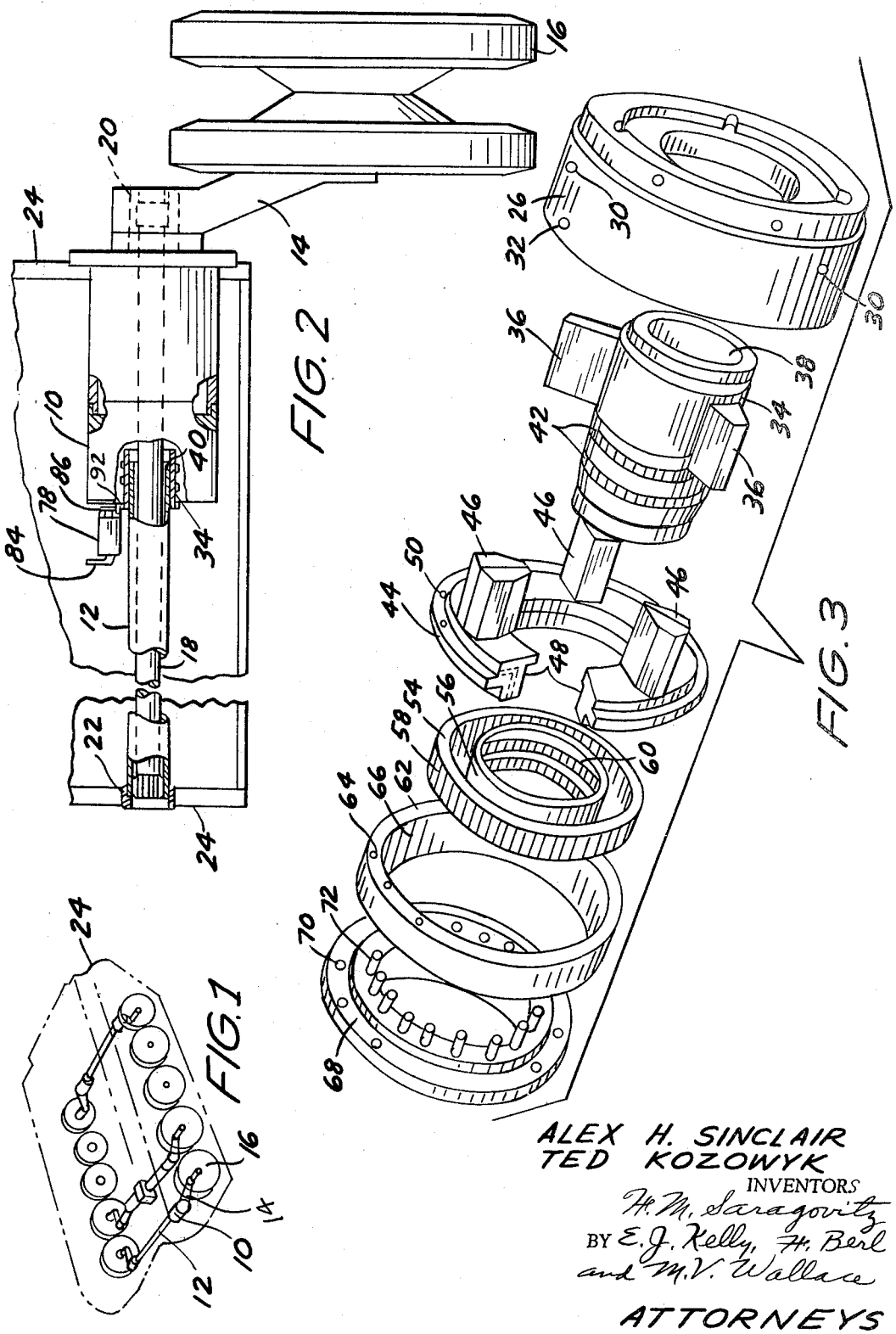
ALEX H. SINCLAIR
TED KOZOWYK
INVENTORS
ATTORNEYS April 7, 1970  T. KOZOWYK ET AL  3,504,931
VEHICLE VARIABLE HEIGHT ACTUATOR Filed Oct. 4, 1967  3 Sheets-Sheet 2

ALEX H. SINCLAIR
TED KOZOWYK
INVENTORS

April 7, 1970  T. KOZOWYK ET AL  3,504,931
VEHICLE VARIABLE HEIGHT ACTUATOR
Filed Oct. 4, 1967  3 Sheets-Sheet 3
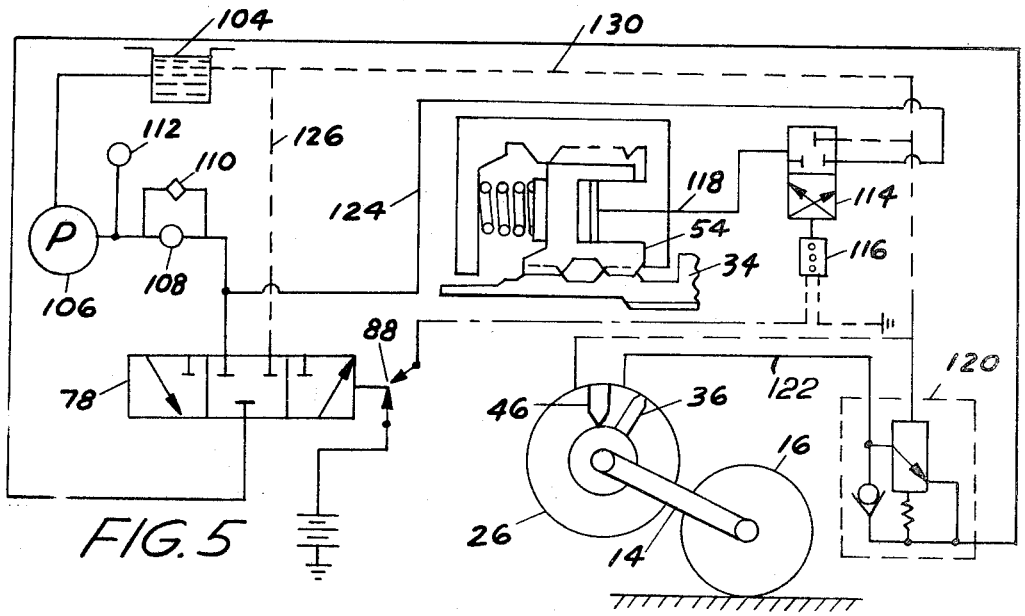
FIG. 5
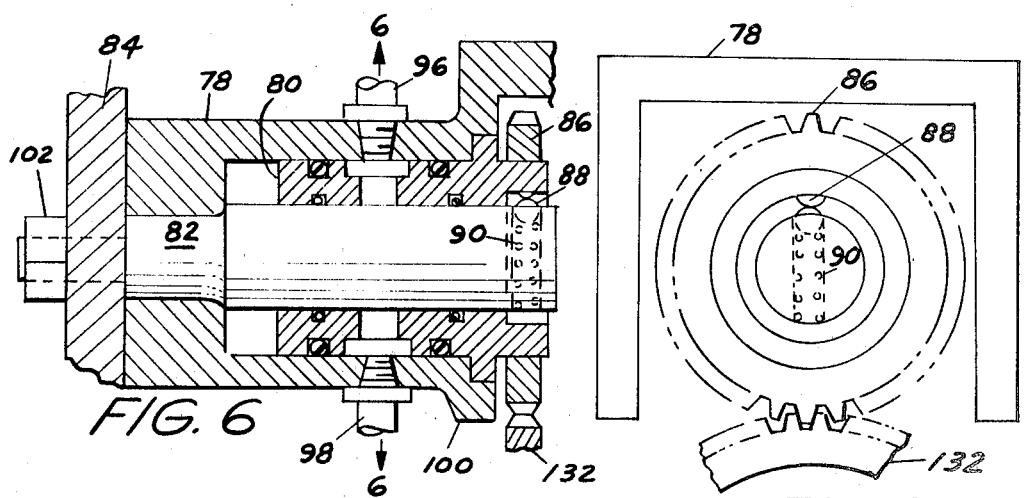
FIG. 6
FIG. 7
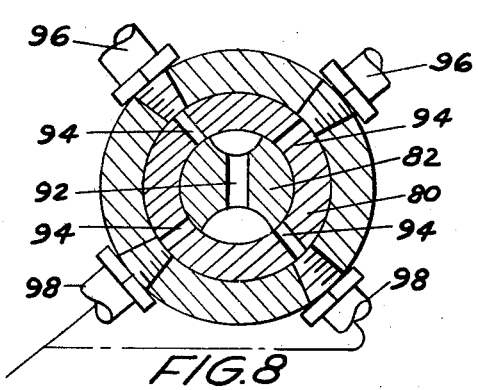
FIG. 8
ALEX H. SINCLAIR
TED KOZOWYK
INVENTORS
BY H.M. Saragovitz
E.J. Kelly, H. Berl
and M.V. Wallace
ATTORNEYS United States Patent Office 3,504,931
Patented Apr. 7, 1970

3,504,931
VEHICLE VARIABLE HEIGHT ACTUATOR
Ted Kozowyk, Detroit, and Alex H. Sinclair, Southfield, Mich., assignors to the United States of America as represented by the Secretary of the Army
Filed Oct. 4, 1967, Ser. No. 672,936
Int. Cl. B60g 7/00, 17/00
U.S. Cl. 280—124                    4 Claims

ABSTRACT OF THE DISCLOSURE

An apparatus for actuating and controlling the variable vehicle ground clearance of tracked or wheeled vehicles.

---

The invention described herein may be manufactured, used, and licensed by or for the Government for governmental purposes without payment to us of any royalty thereon.

In the past multi-wheel vehicles have been designed for use as battle tanks, gun carriers, troop carriers, or the like, wherein within applicants' knowledge, the top ground clearance has been fifteen or sixteen inches, which height has not proven too successful especially on uneven terrain or muddy ground.

The present disclosure sets forth a new and improved multiwheel vehicle, and more particularly a vehicle height control actuator system, adapted to selectively raise and control the height of the vehicle by torsion bar rotation.

The principal object of the present invention is to provide a new and improved height control actuator for multi-wheeled vehicles, which in turn provides greater ground clearance than formerly obtained, and which allows the vehicle to pass over obstacles of greater height than can be traversed with known multi-wheeled vehicles, and by means of which the wheels are raised or lowered to pre-determined heights simultaneously.

Another object of the invention is to provide a new and improved device by which the roadarm cant or pitch can be changed causing the vehicle silhouette to be raised or lowered by selectively raising and lowering any combination of vehicle wheels whether back or front or those located in staggered opposed relationship on either side of the vehicle.

A further object of the invention is to provide a new and improved shock absorbing means which is housed inside the vehicle hull structure, thereby reducing vulnerability to hazards of ostacles, mud, dust and debris.

A still further object of the present invention is to provide a new and improved means for achieving variable ground clearance enabling the vehicle to maintain higher average speeds than presently obtained when traversing mud and large obstacles normally encountered in cross country operations.

Another object of the invention is to provide means for obtaining high wheel, i.e., elevated vehicle travel which in turn increases vehicle speed when traversing irregular terrain.

A still further object of the invention is to provide a fail-safe system which will automatically engage a vehicle system integral locking device upon power failure during raising or lowering of the vehicle.

The above and other objects of the invention will appear more fully from the following more detailed description, and from the drawings, wherein:

FIGURE 1 is a view of a tank hull, partly broken away to show the wheel suspension of same and the manner in which the actuators are secured thereto.

FIGURE 2 is a perspective view showing how the actuator is secured to the torsion bar and how the road arm and wheel are secured to the spindle.

FIGURE 3 is an isometric exploded cut-away view of the actuator.

FIGURE 5 is a schematic diagram of the hydraulic control of the system.

FIGURE 6 is a longitudinal section taken through the control valve of the actuator.

FIGURE 7 is an end view of the control valve of the actuator.

FIGURE 8 is a section taken substantially along line 6—6 of FIGURE 6 and shows the control spool mounted within the control valve sleeve of the actuator.

Figure 4:
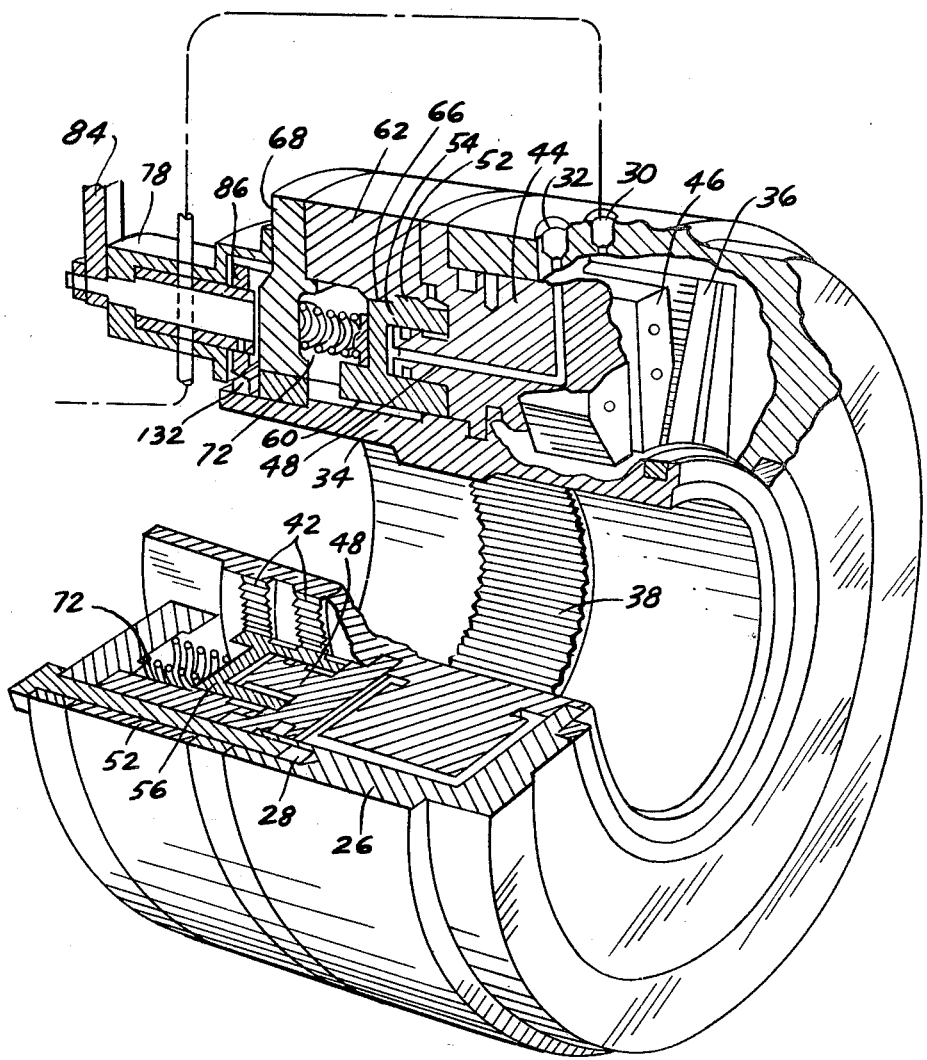
FIGURE 4 is an isometric cut-away view of the assembled actuator unit.

Referring now to the drawings in detail, wherein like reference characters designate like or corresponding parts throughout the several views, there is shown in FIGURE 1 how the actuator 10 is mounted on a torsion tube 12 to actuate a roadarm 14 upon which is mounted a roadwheel 16, said torsion tube 12 having disposed therein a torsion bar 18 which in turn is coupled to a spindle 20, which supports roadarm 14. One end of torsion tube 12 is journaled, as at 22, in a vehicle hull 24.

The wheel height actuator 10, per se, is splined to the torsion tube 12 and comprises a housing of steel, or the like, 26 having assembly holes 28, FIGURE 4, formed therein together with one hydraulic lockout port 32 and three rotary actuator ports 30 spaced equally upon the outer periphery of housing 26 to allow the passage of oil by means of conduits, not shown, into housing 26. A hub member 34 is provided having formed thereon for rotation therewith three vane members 36 and internal splines 38 which in turn are adapted to mate with splines 40 on torsion tube 12. Spaced-apart splines 42 are provided on hub member 34.

An open-faced plate member 44 is provided, the same being adapted to be secured to housing 26 by bolts sealed in holes 28. The plate 44 has three stationary vanes 46 secured thereto, said vanes being adapted to slip over hub 34 so that vanes 36 will sweep about concentrically within stationary vanes 46, when vanes 46, 36 are seated within housing 26. Member 44 has formed therein a piston-like ring 48. Bolt holes 50 are formed to provide means for attaching the ring 44 to housing 26. The outer periphery of ring 44 is also splined, as at 52. Numeral 54 designates a lock ring member having formed therein a circumferential cavity 56, and exterior splines 58 and interior splines 60 are provided.

A closure ring 62 is provided, the same having formed circumferentially thereon bolt holes 64 to match with holes 50 in open-faced plate 44, and interior splines 66 to engage exterior splines 58 on cavity ring 54 to hold ring 54 within closure ring 62 against movement. An end plate 68 is provided the same having bolt holes 70 to match with holes 64 in ring 62 and having circumferentially located thereon a plurality of protruding spring members 72.

It is to be understood that the members above described are assembled into a single unit by passing ring 44 to housing 26, FIGURE 4. Ring 54 is inserted into ring 62 where ring 54 is held against movement therein and ring 62 is then bolted to ring 44 and end plate 68 is then bolted to one side of ring 62 and the actuator is assembled and ready to use. Standard well-known oil seals are provided throughout the device.

FIGURES 6 through 8 show a flow and position control valve for use with actuator 10. The valve comprises a housing 78 having a ported sleeve 80 disposed therein. A ported spool 82 is rotatably mounted within sleeve 80, the same having mounted on one end thereof a control lever 84, by means of nut 102. Disposed between housing 78 and spool 82 is a control spur gear 86 the same having a poppet electric switch 88 secured thereto.

A detent 90 is interposed within sleeve 80, the same being in vertical alignment with switch 88. Gear 86 is driven by an additional spur gear 132, which in turn is mounted on one end of hub member 34, FIGURES 2 and 4.

As shown in FIGURE 8, in cross section, spool 82 has formed therein an hour-glass shaped orifice 92 and sleeve 80 has a plurality of ports 94 formed therein, the same being adapted to be aligned with ports 96, 98, formed in valve 78.

In FIGURE 5 is shown a schematic diagram of the system's hydraulic control wherein is shown an oil reservoir 104 and pressure compensating pump 106 and filter 108 with a filter check gauge 110 and a pressure gauge 112, a control detent and valve 78, an electric switch 88 and a lock valve 114, with a solenoid 116. Numeral 118 designates an hydraulic connection line leading to the locking mechanism cavity 56 shown in FIGURE 4. Numeral 120 represents a counter balance valve and 122 a fluid pressure line for conveying fluid under pressure to the actuator mechanism cavities formed by vanes 46, 36, roadarm 14 and wheel 16, and numeral 124 an hydraulic line to lock valve 114, and 126 a return line from rotary valve 78 to reservoir 104.

The manner in which the device operates is as follows:

Each wheel of the vehicle has a suspension unit consisting of a roadarm, torsion bar, torsion tube and actuating unit. A vehicle could consist of from four to twelve wheels either individually controlled or in combination to raise, lower or cant the vehicle.

In operation the vehicle driver, in order to raise the vehicle, rotates lever 84 mounted on valve 78, through a control panel adjacent his seat in the vehicle, not shown, in a clockwise direction to a desired height. The height and position indicator can be a well-known visual mechanical lever pointer mechanism providing a ready indication of degrees or inches of movement of the vehicle hull or the indicator may be any known means for providing a height reference. The maximum travel of suspension units would also be a ready indicator as to maximum and minimum height. Rotation of lever 84 rotates spool 82 which is keyed to lever 84 and said movement of spool 82 is imparted to electric switch 88 which is energized thereby. Solenoid 116, FIGURE 5, is connected to lock valve 114 and lock valve 114 opens to pressure. Fluid under pressure from reservoir 104 is pumped by means of pump 106 and flows through hydraulic line 124 to port 118 which allows the lock cavity 56 in ring 54, to become pressurized through a conduit, shown in FIGURE 5 going to port 32, FIGURES 3 and 4, thereby shifting the lock ring member 54 axially to the left on hub 34 to its unlocked position, disengaging said member 54 from splines 42 and allowing the movable vane members 36 on hub 34 to turn freely within the geometric limits of roadarm design. As spool 82 is rotated the hourglass orifice 92 formed in spool 82 is likewise turned to a position in alignment with ports 94, 96 and one of ports 98 whereby fluid flows through said ports to hydraulic pressure line 128, FIGURE 5, through counterbalance valve 120 to the three rotary vane chambers composed of movable vanes 36 and stationary vanes 46 whereby the rotary vane members 36 mounted on hub 34, which in turn is mounted upon torsion tube 12 rotates said tube, torsion bar 18, spindle 20, roadarm 14 and wheel 16.

As the vehicle is being raised gear 132 which is secured directly to hub member 34 and in mesh with gear 86 mounted on ported control sleeve 80, FIGURE 6, is turned thereby moving gear 86 and control sleeve 80. Upon reaching the desired vehicle height, switch 88 on control sleeve 80 contacts detent 90 on spool 82 and de-energizes switch 88 and solenoid 116, allowing fluid in lock cavity 56, FIGURE 4, to flow back to reservoir 104 through an hydraulic return line 130, FIGURE 5, locking actuator 10 in the selected position by shifting ring member 54 into locked position on hub 34 by means of spring 72 on end plate 68 at the desired height. Ports 94 in sleeve 80 are now out of alignment with hour-glass orifice 92 blocking fluid flow through the control valve 78.

To lower the vehicle lever 84 is moved in a counter-clockwise direction. Switch 88 is then energized and the lock 56 is released as explained above. Fluid flows through the counter balance valve 120 to reservoir 104, thereby allowing the movable vanes 36 to move from raised position whereby the vehicle is lowered. Upon reaching the desired lowered position the lock 56 is engaged as described above whereby the vehicle is held in a set position. Members 108, 110 and 112 are filter, filter check gauge and pressure gauge respectively, well known in the hydraulic control circuit art and are incorporated in the system to provide the necessary protection to same.

In case of a power failure during raising and lowering of the vehicle, the hydraulic fluid is displaced from the coupler cavity 56 whereby the springs 72 on plate 68 become extended and ring member 54 moves to the right axially on hub member 34 away from end plate 68, thus engaging the locking splines 42 and locking rotor member 34 against movement.

There has been disclosed herein a new and improved device to raise and lower a vehicle whereby the vehicle can now be raised to heights to accomplish ground clearances not previously possible and to achieve high cross-country vehicle speeds with more comfort to the personnel operating the vehicle.

We wish it to be understood that we do not desire to be limited to the exact details of construction shown and described, for obvious modifications will occur to a person skilled in the art.

We claim:

1. A variable height suspension system comprising in combination,
   a vehicle,
   torque means comprising,
   a torsion bar within a torsion tube,
   a roadarm mounted upon said torsion bar, suspended beneath said vehicle,
   a roadwheel rotatably mounted upon said roadarm,
   a fluid reservoir,
   actuator means having a hub member for raising and lowering said vehicle mounted upon said torsion tube,
   valve means for hydraulically turning said actuator,
   conduit means for transferring fluid from said reservoir to said valve and actuator,
   control means for selectively operating said hydraulically controlled actuator,
   control means for locking said actuator at a height selected when lifting or lowering said vehicle,
   means for locking said actuator in case of hydraulic system power failure,
   said power failure locking means comprising a cavity ring with full splines on the outer periphery of same and split splines on the interior opening of said cavity ring, wherein said outer splines are engaged with splines on a stationary closure ring and said interior splines are engaged or disengaged with splines on said hub member.

2. A variable height suspension system as set forth in claim 1, wherein said valve means for hydraulically turning said actuator comprises, a ported housing, a ported sleeve member rotatably mounted within said housing, a ported spool member rotatably mounted within said sleeve member, means for turning said spool, gear means mounted on said sleeve member, gear means mounted on said torsion tube member and in mesh with said gear mounted on said ported sleeve member and electric switch means to energize said control means for locking said actuator at a height selected when lifting or lowering said vehicle.

3. A variable height suspension system as set forth in claim 2, wherein said valve means for hydraulically turning said actuator comprises a ported housing, a ported sleeve member rotatably mounted within said housing, a ported spool member rotatably mounted within said sleeve member, means for turning said spool, gear means mounted on said sleeve member, gear means mounted on said torsion tube member and in mesh with said gear mounted on said ported sleeve member, electric switch means to energize said control means for locking said actuator at a height selected when lifting or lowering said vehicle, said control means comprising a hydraulic reservoir, a pump, control valve, lock-out valve, and counter balance valve, wherein said lockout valve is automatically energized or de-energized by said electric switch means and said meshing gears when said valve means are actuated.

4. A variable height suspension system as set forth in claim 2, wherein when said means for turning said spool member is rotated to the position desired to raise or lower said vehicle, said gear mounted on said ported sleeve and in mesh with gear mounted on said hub member will open or close said lock valve, and will cancel the initial input through said control valve by aligning or non-aligning said ports in said control valve.

References Cited
UNITED STATES PATENTS

| | | | |
|---|---|---|---|
| 3,047,283 | 7/1962 | Kivell. | |
| 3,117,800 | 1/1964 | Magnuson | 280—124 |
| 3,262,522 | 7/1966 | Johnson | 180—9.2 X |
| 3,352,565 | 11/1967 | Reynolds | 180—9.2 X |
| 3,371,940 | 3/1968 | Sinclair | 180—9.2 X |
| 3,397,897 | 8/1968 | Schultze | 180—9.2 X |

RICHARD J. JOHNSON, Primary Examiner

U.S. Cl. X.R.

180—9.2